Nov. 5, 1968  H. C. DEUTSCHER ET AL  3,408,679
WINDSHIELD WIPER CONSTRUCTION

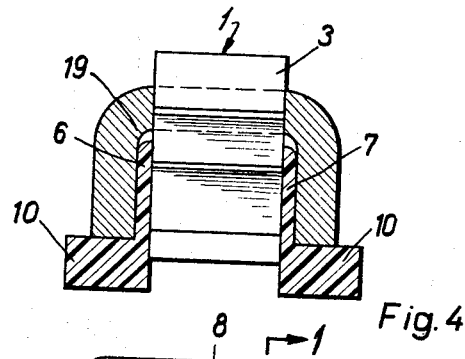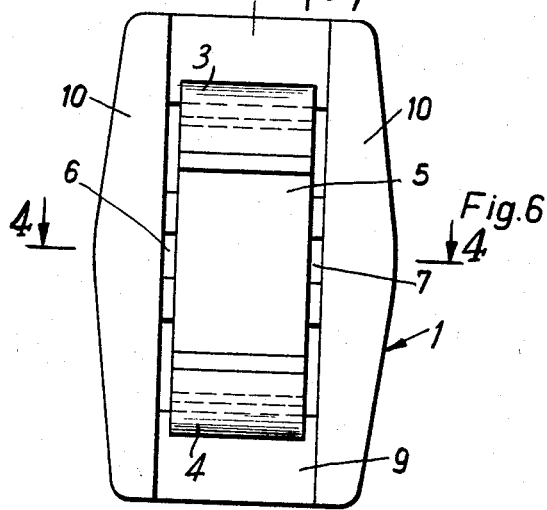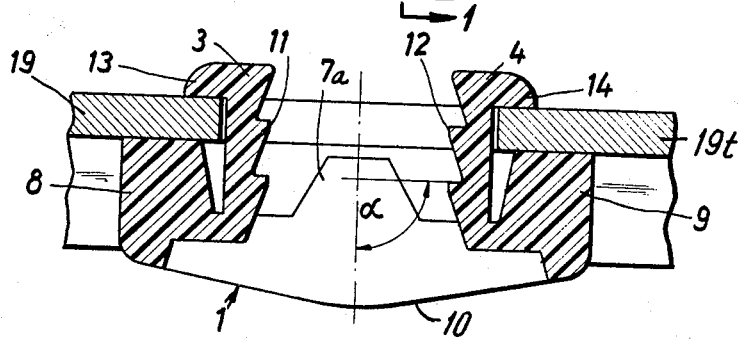

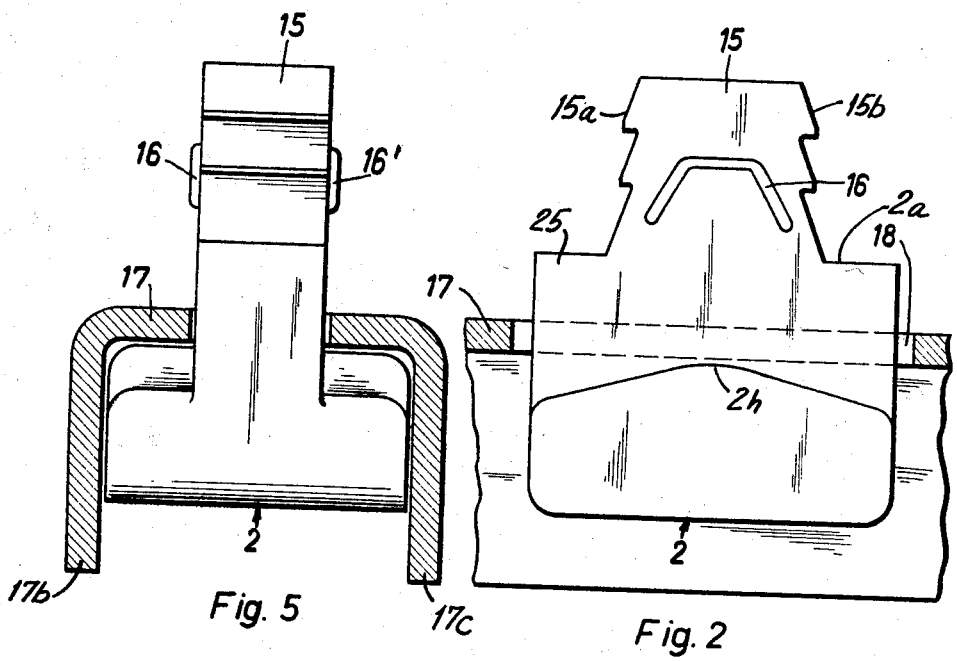
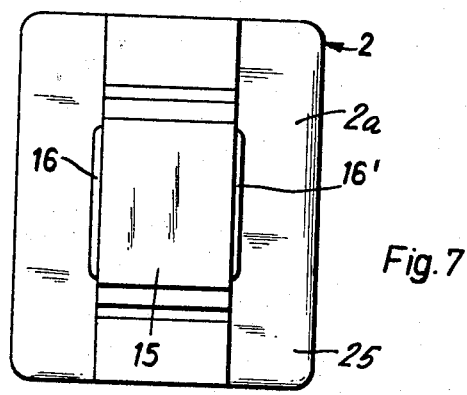

Filed May 13, 1966  3 Sheets-Sheet 3

Inventors
HANS CHRISTIAN DEUTSCHER
WILLY BOCK
ALFRED KOHLER
KURT BAUER

BY McGlew & Toren
ATTORNEYS.

No. 3,408,679
United States Patent Office
Patented Nov. 5, 1968

3,408,679
WINDSHIELD WIPER CONSTRUCTION
Hans Christian Deutscher, Ludwigsburg, Willy Bock and Alfred Kohler, Bietigheim, and Kurt Bauer, Kleiningersheim, Germany, assignors to SWF-Specialfabrik fur Autozubehor Gustav Rau G.m.b.H., Bietigheim, Germany
Filed May 13, 1966, Ser. No. 549,928
Claims priority, application Germany, Oct. 6, 1965, S 99,961
8 Claims. (Cl. 15—250.32)

ABSTRACT OF THE DISCLOSURE

A joint between two parts, for example, between a first wiper blade stirrup and a second wiper blade stirrup includes a female socket part having spaced exterior flange portions which are adapted to engage around the periphery of as lot defined in a U-shaped stirrup member and a central cavity having engagement teeth. The second joint part includes a male member having a projection with engagement teeth which interengage with the female part and a transverse base portion defining a high central point about which a second wiper blade stirrup is pivotal. The two parts are joined together with the male and female elements by first engaging the female element around the slot of the first part so that the transverse shoulder thereof engages beneath a rim of the second part and then interconnecting the two parts by directing the male part into the female part.

Summary of the invention

This invention relates, in general, to a windshield wiper construction, and in particular to a new and useful joint construction particularly for the interconnection and support of individual small-sized stirrup elements which carry a wiper blade from a main wiper arm or stirrup member.

The present invention is particularly concerned with the construction of a swing joint for a windshield wiper. Normally, the connection between a main stirrup or arm for a windshield wiper blade and a smaller sized stirrup which may be secured to one or both ends of a wiper blade is formed by a rivet which provides for a pivotal supporting connection of the stirrup to the arm. The connection is usually made at a location intermediate the length of the stirrup. Joints which are formed in this manner, however, have developed annoying noises which must be prevented by the additional application of springs or plastic inserts. Joints are also known which are constructed with a film hinge having parts to be connected which are extruded. Between the parts, the cross section of the plastic extrusion is reduced to such an extent that a joint is obtained which can swing within certain limits defined by the elasticity of the material and which permits a hinge-like mobility. Such directly injected joints have the disadvantage, however, that because of the necessity of inserting the relatively large and bulky parts, the extrusion machine capacity cannot be fully utilized so that it is not possible to produce them in large quantities. In addition, the amount of the material lost in the extrusion is frequently greater than the amount actually needed for the extrusion.

In accordance with the present invention, there is provided a swing joint for a windshield wiper which comprises a joint formed between a wiper blade arm or main stirrup and a small-sized stirrup which is connected to the wiper blade. The joint is formed by two interengageable parts which are advantageously made of plastic and which include a first part which is engaged with the main arm portion and has a socket for receiving the second part which pivotally carries the small-sized stirrup. The construction of the two parts is such that the interengageable parts lock together. The upper joint part advantageously is in the form of a frame having elastic side or arm portions which extend substantially vertically on each side of the frame interior and are provided with saw tooth shaped formations for interengagement with similar formations formed on a projecting portion of the other part. The formations are such that the joints can be assembled together by inserting the male member into the socket female part, but they may not be removed in an opposite direction after they are locked together.

In a preferred form of the invention, the lower part advantageously extends through a slot in a U-shaped stirrup member and supports the stirrup member in a manner permitting movement thereof only in the wiper blade plane and/or the plane of the main stirrup member axis. For additional securing of the two parts together there is advantageously a bead formation on one of the parts which fits into a web or recess formation on the other.

A further feature of the invention is that the part which is to be affixed to the main stirrup is provided with a bulging surface on its underside of a spacing comparable to the thickness of the main stirrup to which it is to be secured which provides a shoulder recess for receiving a shoulder formation of the lower part which pivotally holds the intermediate stirrup.

Accordingly, it is an object of the invention to provide an improved windshield wiper blade construction for pivotally supporting an intermediate stirrup element which is to be secured to a rubber wiper blade from a main arm or stirrup member.

A further object of the invention is to provide a joint for supporting a wiper blade stirrup from a main arm member or stirrup which includes a first female joint which is adapted to be secured into a slot formed on the main stirrup and which defines a socket, and a second part which is adapted to pivotally support an intermediate stirrup on a shoulder formation thereof and which includes a projection extending upwardly from the intermediate stirrup which is engageable in the socket formed by the first part.

A further object of the invention is to provide a windshield wiper construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a partial longitudinal sectional view of a main wiper blade arm or stirrup having one part of a connecting joint affixed thereto constructed in accordance with the invention;

FIG. 2 is a partial longitudinal sectional view of an intermediate stirrup having a second connecting joint part extending upwardly from a slot therein which is engageable with the part of FIG. 1;

FIG. 4 is a transverse sectional view of the parts indicated in FIG. 1;

FIG. 5 is a transverse sectional view of the part indicated in FIG. 2;

FIG. 6 is a top plan view of the upper joint part; and

FIG. 7 is a top plan view of the lower joint part.

Figure 3:
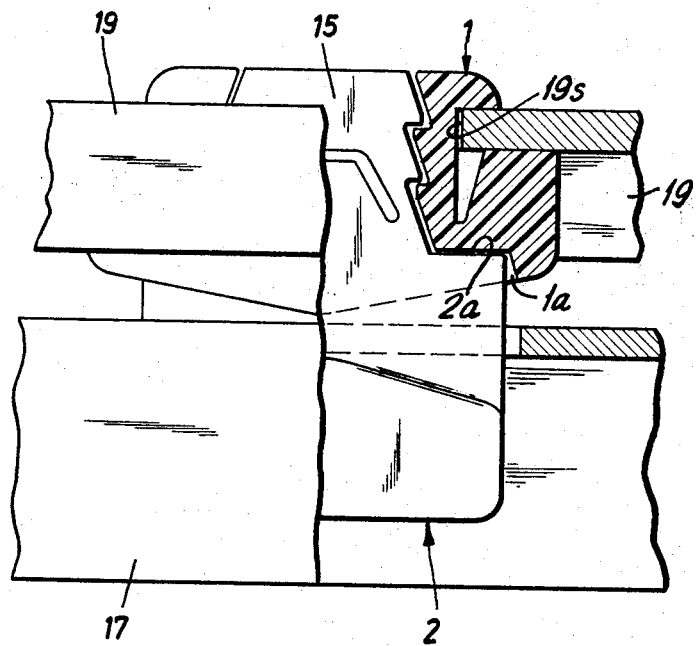
FIG. 3 is a partial elevational and partial longitudinal sectional view of the main wiper blade and the intermediate stirrup with the two joint parts interconnected.

Referring to the drawings, in particular, the invention embodied therein comprises a joint connection particularly for suspending a small-sized stirrup which is usually located adjacent one end of a windshield wiper blade to a main stirrup or holding bar member. In accordance with the invention, the pivotal suspension joint comprises an upper joint part 1 and a lower joint part 2 (see FIG. 3). As indicated in FIG. 3, the joint is constructed such that the upper part is fashioned to engage through a slot 19s of a substantially U-shaped wiper blade support member or main stirrup 19. The member 2 which interlocks with the member 1 pivotally supports an intermediate stirrup 17 which is also of U-shaped cross section configuration.

As best indicated in FIGS. 1, 4 and 6, the part 1 is a female socket part and it includes elastic arm portions 3 and 4 at respective ends which are arranged substantially perpendicularly and in opposition and which define the narrow sides of a frame opening 5. On the longitudinal sides are provided side web portions 6 and 7 at respective sides. The lower ends of each elastic arm portion 3 and 4 is provided with outwardly extending and widened block portions 8 and 9, respectively. A flange 10 is formed at the lower ends of each of the side portions 6 and 7 and extend outwardly beyond a lower end of a U-shaped intermediate stirrup member 19 when it is assembled thereto. The flange 10 is convexly shaped, as best indicated in FIG. 1. The sidewalls 6 and 7, however, are notched centrally as indicated at 7a in FIG. 1.

A feature of the construction of the top part or first joint part 1 is that the elastic arm portions 3 and 4 which face inwardly on the frame are provided with saw-shaped toothing 11 and 12. The formation is such that the tooth flanks advantageously define with a perpendicular center line an angle α which is equal to less than 90°. As can best be seen from FIG. 1, the block portions 8 and 9 engage a top wall 19t of the intermediate member along a planar surface from below and outwardly extending flange portions 13 and 14 engage over this top wall from above.

As indicated in FIGS. 2, 5 and 7, the second joint part or lower part 2 is of substantially inverted T-shape and is provided with a central pin or projecting portion 15 having a substantially rectangular cross section which includes substantially saw-shaped teeth 15a and 15b which are complementary to te teeth 11 and 12 formed on the upper part 1. The faces on the opposite corresponding edges are provided with a projection or bead 16, 16'. The lower part 2 also includes a substantially rectangular block-shaped lower part 25 which is of a width corresponding to the spacing between leg portions 17a and 17b of an intermediate stirrup or member 17 which is to be supported for pivotal movement.

The lower part 2 is locked into the upper part 1 by inserting the projection 15 into the frame portion 5. During insertion, the elastic legs 3 and 4 yield to the insertion force of the pin 15 to permit interengagement of the teeth portions 15a and 15b of the part 2 with the corresponding teeth portions 11 and 12 on part 1. In the completely fitted position indicated in FIG. 3, the teeth mesh such that the two joint parts can no longer be pulled apart. For additional securing of the position of the two joint parts, the bead formations 6 lock behind the respective cutout portions 7a and 6a (only 7a being shown). The part 2 which supports the stirrup 17 is dimensioned such that no sideway movement of the stirrup 17 can take place, but only some slight end-to-end pivotal movement about a shoulder having a lateral high point 2h formed between the ends of the part 2 beneath the flange or web portion of the stirrup 17.

The underside of the member 1 is advantageously provided with a recess 1a which is somewhat squared to accommodate the ledge portion 2a of the part 2. In this manner, the parts are anchored together without permitting any relative rotation.

While a specific embodiment of the invention has been shown and described in detail to illustrate the application of the inventive principles, it will be understood that the invention may be embodied otherwise without departing from such principles.

What is claimed is:

1. A joint construction for suspending one part, for example, a first wiper blade stirrup, from another part, for example, a second blade stirrup, comprising a first female socket part adapted to engage the first blade stirrip and having a socket with at least two opposed resilient wall portions having at least one tooth formation defined therealong, and a second male part for supporting the second blade stirrup having a projecting central pin portion with at least one tooth formation complementary to the tooth formation of said female part and lockingly interengageable therewith, said second male part including a widened transverse base portion adapted to fit beneath a shoulder of one of the stirrups and having a substantially uniform width and with a supporting shoulder having a high intermediate surface and being inclined from said high surface downwardly toward each end for forming a central pivotal high intermediate surface about which the supported stirrup may pivot.

2. A joint construction according to claim 1, wherein said first part includes a block-shaped portion formed at its lower end forming a supporting surface for the first blade stirrup secured thereabove, and an outwardly projecting flange surface at its upper end for overlying the secured surface.

3. A joint construction according to claim 1, wherein said second part includes at least one surface having a projecting bead, said first part having a recess alignable with said bead and interlockable therewith when said parts are together.

4. A joint construction comprising a substantially U-sectioned wiper blade main arm, a substantially U-sectioned wiper blade stirrup member, said blade arm and said stirrup member having a central web portion, respectively, with substantially rectangular slots defined therein, a first female socket part having a portion extending through the slot of said wiper blade main arm and resiliently engaging said arm, and a second male part having a projecting central pin extending through said slot of said wiper blade stirrup member, said socket part having a socket with an access from one end into which said pin is positioned, said pin portion and said socket part having interlocking teeth formations, said second male part including a widened base portion of a width substantially comparable to the width between the interior of said wiper blade stirrup and being formed with a shoulder engaging below the interior of said stirrup permitting pivotal end-to-end movement of said stirrup member.

5. A joint construction according to claim 4, wherein said second male part is provided with a wiper blade stirrup member supporting shoulder formed with a high intermediate surface inclined downwardly toward each end and forming a high pivot point for pivotal movement of said wiper blade stirrup member.

6. A joint construction according to claim 4, wherein said first female socket part includes a recessed portion on its lower face of substantially rectangular configuration, said second male part having a lower portion of substantially rectangular configuration which is interlocked in said recessed portion.

7. A joint construction according to claim 4, wherein said second male part includes two opposed faces having teeth engaging with complementary interior resilient portions of said female socket part, said pin portion further including a bead formation on at least one additional side engageable in a recess of said female socket part.

8. A joint construction according to claim 4, wherein said female socket part includes a top flange resiliently bearing on the top of said main wiper blade arm, and a bottom block-shaped portion resiliently bearing against the interior of said wiper blade main arm.

References Cited

UNITED STATES PATENTS 3,179,969  4/1965  Glynn _____ 15—250.

CHARLES A. WILLMUTH, *Primary Examiner.*

ROBERT I. SMITH, *Assistant Examiner.*